(12) United States Patent
Braatz et al.

(10) Patent No.: US 7,140,698 B2
(45) Date of Patent: Nov. 28, 2006

(54) HYDRAULIC CONTROL AND OPERATION SYSTEM FOR A RAILROAD CAR RETARDER

(75) Inventors: James D. Braatz, Greenfield, WI (US); Lowell B. Ziese, Pewaukee, WI (US); Richard Bohme, Louisville, KY (US)

(73) Assignee: AAA Sales & Engineering Inc., Oak Creek, WI (US)

( * ) Notice: Subject to any disclaimer, the term of this patent is extended or adjusted under 35 U.S.C. 154(b) by 5 days.

(21) Appl. No.: 10/882,650

(22) Filed: Jul. 1, 2004

(65) Prior Publication Data

US 2005/0035243 A1    Feb. 17, 2005

Related U.S. Application Data

(60) Provisional application No. 60/484,216, filed on Jul. 1, 2003.

(51) Int. Cl.
*B60T 8/18*    (2006.01)

(52) U.S. Cl. .................. 303/22.7; 210/167; 210/416.5; 104/26.2

(58) Field of Classification Search .................. 303/70, 303/22.7; 188/62, 140 A; 104/249, 252, 104/26.1, 26.2; 210/167, 416.1, 416.5
See application file for complete search history.

(56) References Cited

U.S. PATENT DOCUMENTS

| | | | |
|---|---|---|---|
| 3,227,246 A * | 1/1966 | Wilson ........................ 188/62 |
| 3,557,910 A * | 1/1971 | Wilson ........................ 188/62 |
| 3,809,188 A * | 5/1974 | Frank et al. ................... 188/62 |
| 3,926,124 A | 12/1975 | Frank |
| 3,946,973 A | 3/1976 | Budway et al. |
| 4,027,595 A * | 6/1977 | Frank et al. ................ 104/26.2 |
| 4,098,374 A * | 7/1978 | Frank ........................... 188/62 |
| 4,113,621 A * | 9/1978 | Frank et al. ................ 210/167 |
| 4,125,177 A | 11/1978 | Durraffourt |
| 4,198,909 A | 4/1980 | Plantureux |
| 4,235,403 A | 11/1980 | Gillen et al. |
| 4,480,723 A | 11/1984 | Ingvast et al. |
| 4,650,038 A | 3/1987 | Bick |
| 4,766,815 A | 8/1988 | Chongben et al. |
| 4,867,279 A | 9/1989 | Link et al. |
| 5,092,248 A | 3/1992 | Parry |
| 5,388,525 A | 2/1995 | Bodkin |
| 5,493,086 A * | 2/1996 | Murphy et al. ........... 200/84 R |
| 5,494,342 A | 2/1996 | Engle |
| 5,676,337 A | 10/1997 | Giras et al. |
| 5,730,260 A | 3/1998 | Thyssen |
| RE36,036 E | 1/1999 | Engle |
| 5,904,321 A * | 5/1999 | Cox et al. ................ 244/134 R |
| 6,199,671 B1 | 3/2001 | Thyssen |

* cited by examiner

Primary Examiner—James McClellan
Assistant Examiner—Mariano Sy
(74) Attorney, Agent, or Firm—Andrus, Sceales, Starke & Sawall, LLP

(57) ABSTRACT

A hydraulic control and operating system is provided for a railroad car retarder to control the movement of railroad cars in railroad classification yard. The system utilizes a double-acting hydraulic cylinder to operate the retarder mechanism and includes a hydraulic control circuit that provides protection against pressure spikes and high pressure excursions, high and low temperature excursions, low oil levels and oil filter fouling. The above system not only shuts itself down to prevent damage, but provides a warning to maintenance staff that service should be performed long before a need for system shut-down is required. The system includes a central operating panel in the rail yard control center, remote control panel located at the position of the retarder and the system can be connected for operation from a completely remote location.

11 Claims, 4 Drawing Sheets

HYDRAULIC CONTROL AND OPERATION SYSTEM FOR A RAILROAD CAR RETARDER

CROSS-REFERENCE TO RELATED APPLICATIONS

This application is based on and claims the benefit of Provisional Application No. 60/484,216, filed Jul. 1, 2003.

FIELD OF THE INVENTION

The present invention pertains to a hydraulic control and operating system for a railroad car retarder and, more particularly, to such a control and operating system that includes protection against hydraulic shock and overload, protection against operational problems at extreme temperatures, and the ability to monitor and operate retarder function on-site and from a remote location in addition to normal operation from a railroad yard tower.

A railroad car retarder is used in a railroad classification yard to regulate the speed of freight cars being arranged to make up a train or temporarily sidetracked. Many types of hydraulic, pneumatic and mechanical retarders are known in the industry, but in all cases, such retarders must operate effectively and efficiently in adverse weather and in climates where temperatures may vary between the extremes of heat and cold.

Although car retarders are typically operated from a central freight yard tower or other advantageous position from which the entire freight yard may be viewed, maintenance, repair and servicing of the retarder often requires personnel to work directly at the site of the retarder.

One known type of railroad car retarder includes a pair of parallel brake bars positioned on each side of both track rails where they can be moved toward one another to clamp therebetween the wheels of a rolling railroad car entering the retarder. The braking bars are typically spring-biased to open and are closed to effect a variable braking load by controlling the hydraulic pressure in a double-acting cylinder connected to a mechanical brake bar operating linkage. By varying the hydraulic force exerted by the cylinder, the amount of braking force applied to the car wheels can be likewise varied. Each rail of the track through the retarder includes a pair of braking bars with both pairs controlled by the same mechanical linkage.

Shock loads on a hydraulic retarder operating system are regularly encountered and may result in pressure spikes or excess pressure excursions that can propagate back through the hydraulic system and damage system components. In addition, because these systems must operate outdoors and at extreme ambient temperatures, both hot and cold, the temperature of the hydraulic operating oil must be maintained within a suitable range. Such extreme conditions of use also contribute to operating oil contamination and, therefore, appropriate and effective filtering of the oil is important.

SUMMARY OF THE INVENTION

In accordance with the present invention, an improved hydraulic control and operating system for a railroad car retarder addresses all of the prior art operating problems with a comprehensive monitoring, control and operating format for a retarder of the type that utilizes a double-acting hydraulic cylinder supplied with operating oil from a motor-driven hydraulic pump. The pump draws operating oil from a reservoir and delivers the oil to one end of the hydraulic cylinder via an appropriate hydraulic control valve. The system includes means for preventing operating pressure spikes and excess pressure excursions from propagating back to system components that would be damaged, heat exchange means for controlling the temperature of the operating oil below a specified maximum operating temperature, means for filtering the operating oil in both the oil supply and return lines, and means for operating the retarder from either a central freight yard control center or at the location of the retarder itself.

The hydraulic control system preferably comprises a directional control valve that is operable to apply operating oil from a supply line from the pump to a selected end of the cylinder and to direct the return of operating oil via a return line to the reservoir, and a counterbalance valve between the control valve and each end of the cylinder to hold the position of the cylinder rod at system operating pressure. In the presently preferred embodiment, the directional control valve comprises a three position solenoid operated valve that provides pressurized hydraulic flow to each end of the cylinder via a selected one of two operating positions, and an open center position that provides recirculation of operating oil from the pump to the reservoir.

The means for preventing pressure spikes and excursions comprises, in combination, the counterbalance valves, a bypass check valve in the return line and a pressure relief valve in the supply line. In the preferred embodiment, the directional control valve, the counterbalance valves, the bypass check valve and the pressure relief valve are all mounted in a common manifold.

The heat exchange means includes a heat exchanger mounted in the oil return line to the reservoir, a high temperature warning sensor in the reservoir which is operative to generate a high temperature warning signal at a first given oil temperature, and a high temperature shut-down sensor in the reservoir that is operative to generate a high temperature shut-down signal to shut down the system at a second given oil temperature higher than the first given oil temperature.

The filtering means preferably comprises a first oil filter mounted in the supply line between the reservoir and the pump inlet, a second oil filter mounted in the return line between the heat exchanger and the reservoir, means for monitoring the oil pressure drop across each of said filters and generating an excessive pressure drop signal, and a by-pass valve for each filter to permit a continued flow of oil at a pressure drop higher than the pressure drop causing generation of the excessive pressure drop signal.

In the presently preferred embodiment of the invention, the operating means includes a programmable microprocessor in the control center that is operative to transmit retarder control signals to operate the cylinder and to receive and process cylinder position signals and signals from the heat exchange means and the filtering means, and a manual control at the retarder that is operative to lock out the microprocessor control and to permit manual operation of the cylinder. The operating means may also include a remote control link to the microprocessor permitting monitoring and control of the system from any remote location outside the rail yard.

The system may also include means for monitoring oil level in the reservoir and for generating the first low level warning signal and second lower level shut down signal.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
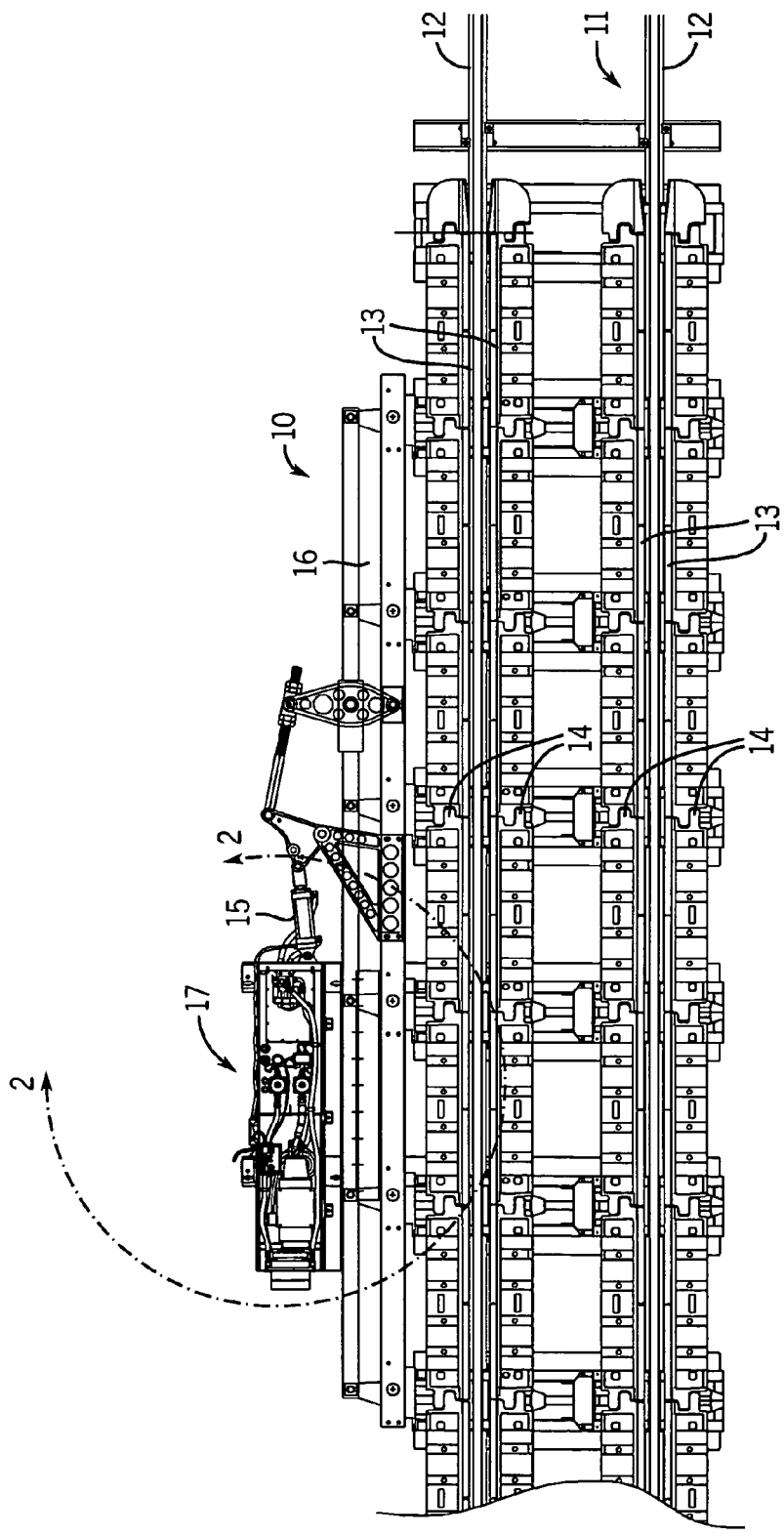
FIG. 1 is a plan view of a railroad car retarder utilizing the hydraulic control and operating system of the present invention.

In FIG. 1, a railroad car retarder 10 is shown mounted along a section of track 11 comprising a pair of conventional rails 12. It will be understood that the track 11 continues in both directions from the retarder with railcars entering the retarder from the right in the direction shown by the arrow. Each retarder 10 includes a pair of parallel braking bars 13 positioned on opposite sides of and parallel to each of the rails 12. The braking bars 13 are also positioned above the tops of the rails 12 such that, when moved toward one another, the braking bars engage the sides of the car wheels to effect a braking or retarding of the moving rail car, all in a manner well known in the art.

In the conventional retarder shown in FIG. 1, the braking bars 13 are biased to open (to move away from one another and from the rail car wheels) by sets of bias springs 14 positioned along the length of the retarder. A hydraulic cylinder 15 is operatively connected to a parallel bar linkage 16 such that extension of the cylinder 15 causes both pairs of braking bars 13 to be forced together against the bias of the springs 14. As will be described more detail below, the hydraulic control system is capable of operating the cylinder 15 to vary the braking force applied to the braking bars and, therefore, the braking force applied to the rail car wheels.

Figure 2:
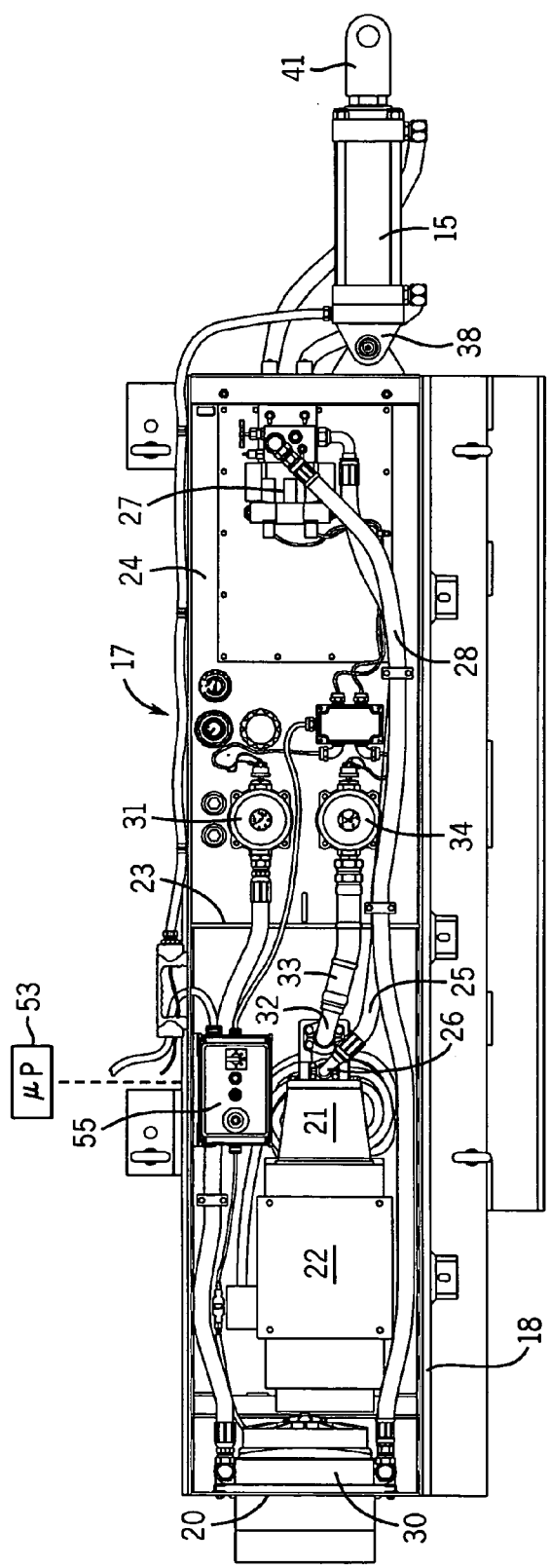
FIG. 2 is an enlarged detail of FIG. 1 showing the hydraulic operator incorporating features of the present invention.
Figure 3:
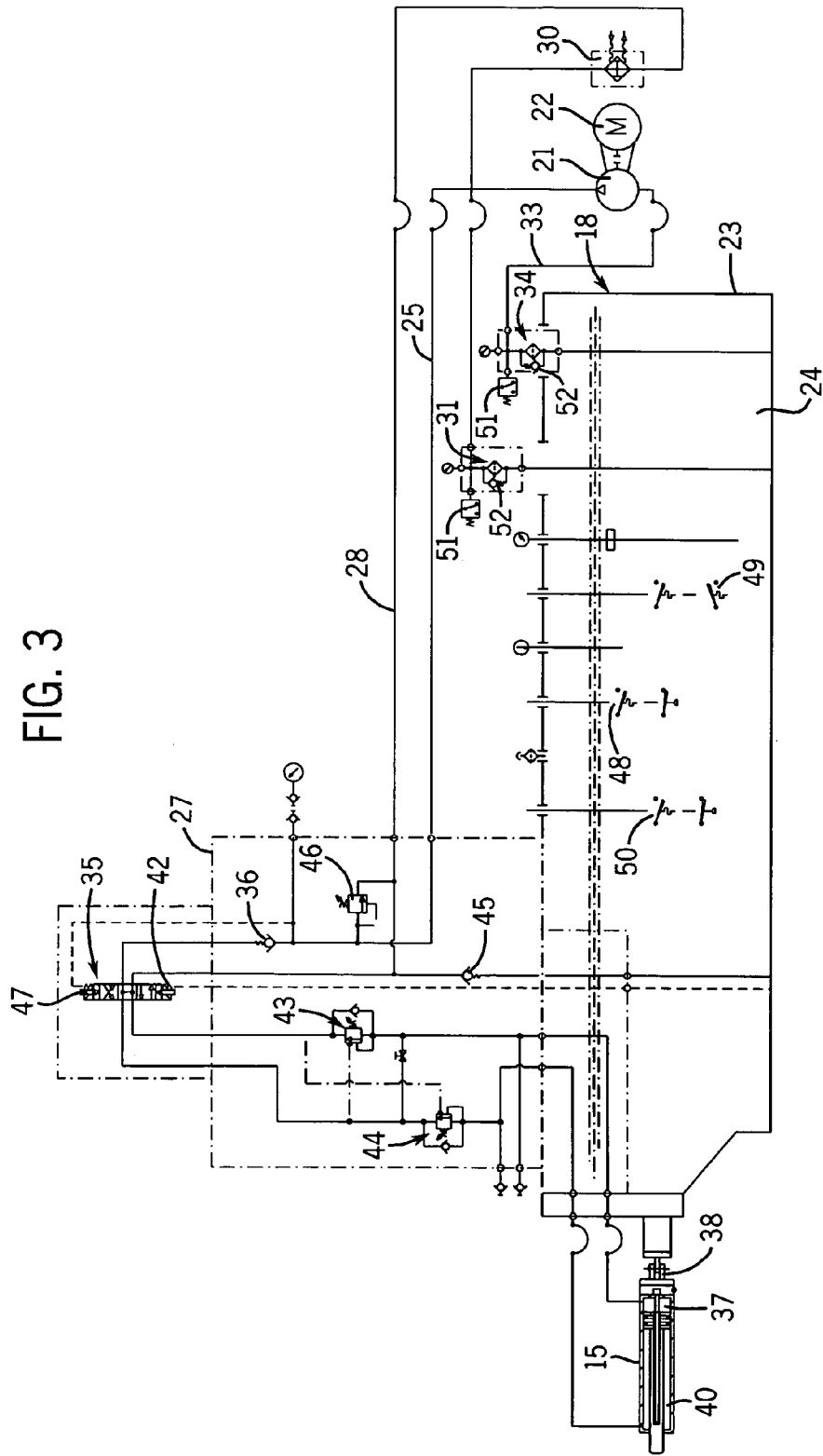
FIG. 3 is a schematic of the hydraulic system of the present invention.

Referring also to FIG. 2, a hydraulic power unit 17 is mounted on one side of the track 11 adjacent the parallel bar linkage 16. The power unit 17 supports and provides operating fluid to the hydraulic cylinder 15 in a novel manner as will be described. The power unit 17 is enclosed in a box-like housing 18 which is generally weather tight, except for a cooling air vent 20 in one end of the housing.

The power unit 17 includes a hydraulic pump 21 driven by an electric motor 22. The pump and motor are mounted within one end of the housing 18. A center bulkhead 23 defines one end wall of a reservoir 24 for the hydraulic operating oil on the other end of the housing 18. A hydraulic supply line 25 delivers pressurized hydraulic fluid from the pump outlet 26 to a manifold 27 for the hydraulic controls. An oil return line 28 provides a return flow path for the hydraulic oil from the manifold 27 to the reservoir 24. Before reaching the reservoir, the return line 28 directs the hydraulic oil through a heat exchanger 30 and a return oil filter 31. Hydraulic oil from the reservoir 24 is supplied to the pump inlet 32 via a pump supply line 33 after passage through a supply oil filter 34. The housing, including all of the components thus far described is enclosed by a cover (not shown) attached with a hinged connection to one longitudinal edge of the housing.

The flow of pressurized hydraulic oil in the supply line 25 enters the manifold 27 and is directed to the main control valve 35 after passing through check valve 36. Check valve 36 assures a minimum pilot pressure for the control valve 35. Control valve 35 comprises a solenoid-operated three position directional control valve operable to direct pressurized hydraulic flow to each end of the hydraulic cylinder 15 via a selected one of two operating positions. If neither directional control solenoid is activated, the valve moves to an open center position providing recirculation of operating oil from the supply line 25 directly to the return line 28 and to the reservoir 24.

The head or piston end 37 of the hydraulic cylinder 15 is attached by a clevis 38 to the end wall of the housing 18. The rod end 40 of the cylinder 15 includes a clevis connection 41 to the force transmitting linkage 16 of the retarder. The rod end 40 of the cylinder is typically extended to close the braking bars 13 against the bias of springs 14 to impose a braking load on the car wheels. When the piston end solenoid 42 of the control valve 35 is activated, pressurized hydraulic fluid from the supply line 25 is directed through a piston end counterbalance valve 43 to the piston end 37 of the cylinder to cause the piston rod to extend. Return flow from the rod end 40 of the cylinder is directed through a rod end counterbalance valve 44 to the directional control valve 35 and then to the return line 28 to the reservoir 24 after passing first through the heat exchanger 30 and return oil filter 31.

The load applied to the retarder braking bars 13 and car wheels in the retarder is proportional to the distance that the rod end 40 is extended. Cylinder rod extension (or retraction) is monitored by an internal linear position transducer (not shown) mounted internally on the piston rod of the cylinder. When the cylinder rod end 40 reaches its selected position, the piston end solenoid 42 is de-energized, causing the valve to return to its neutral center position and movement of the cylinder rod stops. Continued operation of the motor and pump 22 and 21, respectively, directs oil back to the reservoir 24. If a cylinder control signal from a system microprocessor (53 in FIG. 2) orders the cylinder to change position and a cylinder rod position signal representative of the change in position is not received within a designated time (e.g. 20 seconds), it is assumed that a serious system malfunction has occurred and the system will automatically shut down. Such a shut down will generate an alarm signal to the yard operating control center (often called the "tower") so that the operator can take immediate action, such as halting the movement of cars into the retarder. The serious system condition generating the shut-down alarm signal could involve the rupture of a hydraulic line. In such a case, the shut down would include halting the motor and pump to prevent the accidental discharge of hydraulic fluid.

The counterbalance valves 43 and 44 are pilot-operated (e.g. at a pilot pressure of 1,000 psi) and operate to hold the cylinder in its selected position. The valves also have a high pressure relief (e.g. at 3,000 psi) in the event a pressure spike or high pressure excursion from operation of the retarder is encountered. The directional control valve 35 and other system components on the supply and return side of the valve (e.g. the hoses and filters 34 and 35) are also protected against pressure spikes and high pressure excursions. For example, if a pressure release is ordered with a car in the retarder, the de-energization of the solenoid may result in a high bias spring force that could generate a pressure wave in excess of the relief setting of the counterbalance valves, which force could propagate through the hydraulic system and cause, for example, the filters to be blown out. Check valve 45 in the return line 28 is set at a relatively low pressure (e.g. 75 psi) to relieve the over-pressure by directing hydraulic oil to the reservoir 24.

In addition, to provide over-pressure protection in the supply line 55, a high pressure relief valve 46 (e.g. set at 1,500 psi) operates to limit maximum system pressure by diverting over-pressure fluid to the return line 28 and reservoir 24.

The manifold 27 houses all of the hydraulic control components, including the control valve 35, counterbalance valves 43 and 44, check valve 36, check valve 45 and relief valve 46. This eliminates nearly all external flow connections, thus reducing considerably the number of potential leak points.

To provide controlled retraction of the cylinder 15, the rod end solenoid 47 in the control valve 35 is actuated to direct the flow of pressurized hydraulic oil through the rod end counterbalance valve 44 and into the rod end 40 of the cylinder. Simultaneously, the flow of oil from the piston end 37 flows through the counterbalance valve 43, control valve 35 and into the return line 28.

It is preferred to maintain hydraulic operating oil in the reservoir 24 below a temperature of about 140° F. (about 60° C.). A high temperature warning sensor 48 in the reservoir 24 operates to generate a high temperature warning signal if the oil temperature exceeds about 140° F. (about 60° C.). Temperature may be read at the power unit 17 and the signal is also transmitted to the control tower. If the temperature of the oil continues to rise and reaches a temperature in excess of about 160° F. (about 70° C.), a high temperature shutdown sensor 50 operates to completely shut down the system. For operation in cold climates, the hydraulic power unit 17 includes an optional oil heater (not shown) that is operable when the oil temperature drops to a specified level. For example, a low temperature sensor 49 in the reservoir 24 provides a signal to operate the oil heater when the temperature of the oil drops to 40° F. (about 4° C.).

Each of the return oil filter 31 and the supply oil filter 34 includes a replaceable filter cartridge. Considering, however, the fact that the timely replacement of filter cartridges is often not done, the pressure drop across each of the filters 31 and 34 is monitored by a normally open pressure switch 51. If the pressure drop across the filter reaches a specified level, the pressure switch closes generating a "service required" light to turn on. If service is ignored a by-pass check valve 52 in each of the filters permits oil to continue to flow should the filter become severely clogged.

Figure 4:
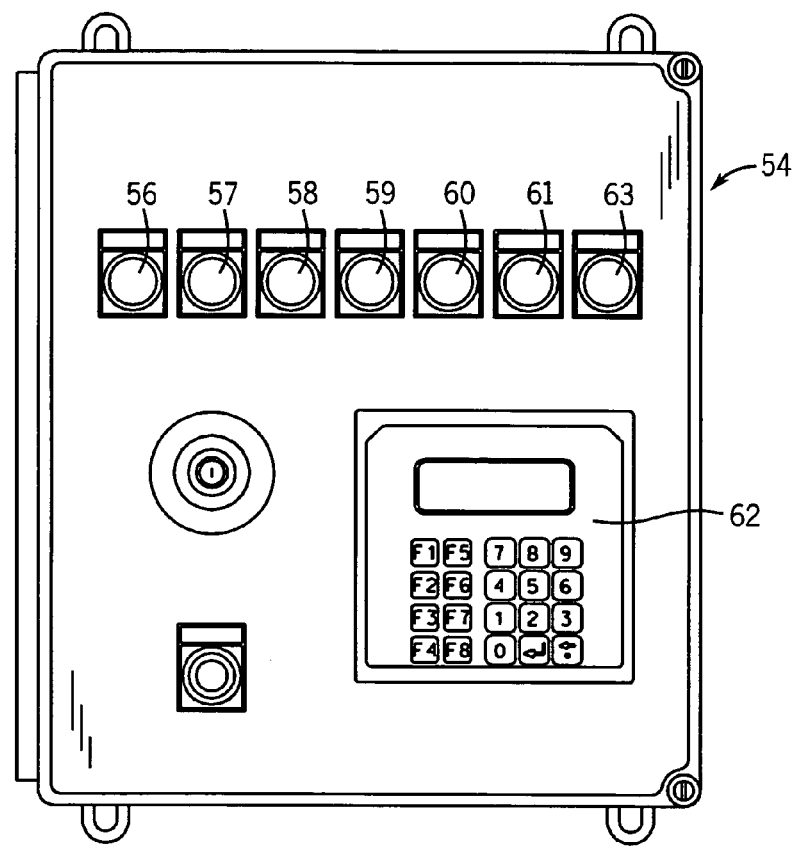
FIG. 4 is a plan view of the main operator interface for the retarder system.

The retarder system of the present invention is intended to be controlled and operated from the central tower in the classification yard, but may also be controlled remotely at the location of the retarder itself. The main control system in the control tower includes a microprocessor, preferably a programmable logic controller (PLC) 53 in FIG. 2. A main operator interface 54, as shown in FIG. 4, may be conveniently mounted on the housing for the PLC in the control tower. The position of the cylinder 15 is controlled by inputs from a main yard process computer which also provides signals to the operator interface 54 to indicate the desired cylinder position. Limited control of the cylinder is also provided at a remote operator panel 55 mounted in the housing 18 for the hydraulic power unit 17, as will be described in more detail below. When a cylinder position input is received by the PLC 53 at the main operator interface 54, the PLC evaluates the transducer position and determines whether the cylinder needs to extend or retract to attain the input position. The PLC then generates a motor start signal and energizes the appropriate solenoid 42 or 47 to, respectively, extend or retract the cylinder rod. When the cylinder position signal from the linear position transducer in the cylinder corresponds to the requested position, the solenoid 42 or 47 is de-energized. The motor 22 continues to run for a preset amount of time (e.g. 20 seconds) and, if an input signal remains, the motor shuts down and the cylinder position is maintained. If after the motor time out period a new signal is not received and no input signal is present at the PLC, the cylinder moves to an idle position and the motor turns off.

In FIG. 4, the main operator interface has a row of system indicator lights including (1) a system enabled light 56 indicating the system is operable and is ready to receive inputs; (2) a motor start light 57 indicating the motor field winding is energized; (3) a motor run light 58 indicating that the motor armature is energized and the motor is running; (4) a cylinder forward light 59 indicating the cylinder is extending; (5) a cylinder back light 60 indicating that the cylinder is retracting; (6) a service required light 61 indicating the hydraulic system requires service with the specific service identifier accessible via the operator interface and LED display 62; and (7) a system shut down light 63 with shut down information displayed on the LED display 62. The operator interface permits the operator to customize retarder operating parameters, do calibration and testing, access maintenance service messages (per service required light 61), and access system shut down information (as prompted by system shut down light 63).

Figure 5:
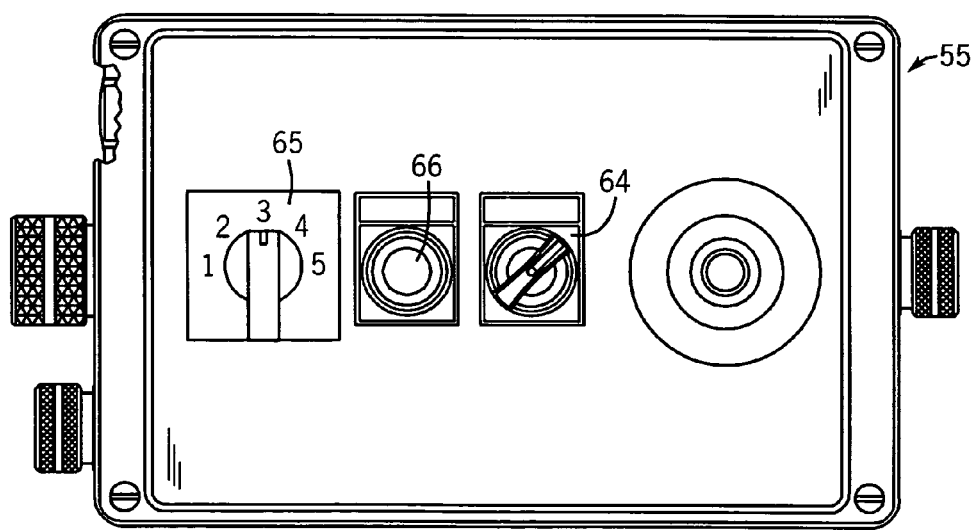
FIG. 5 is a plan view of the remote operator panel for the retarder of the present invention.

Referring to FIG. 5, the remote operator panel 55 permits maintenance or service personnel to provide limited operation of the hydraulic power unit at its specific location. When the selector switch 64 on the remote operator panel 55 is moved from AUTO to MANUAL, control center inputs to the PLC are locked out and the cylinder 15 can be positioned in any one of five positions indicated on the position selector switch 65 when pressing the move to position button 66.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:
1. A hydraulic control and operating system for a railroad car retarder utilizing a double-acting hydraulic cylinder having a cylinder rod end defined by a cylinder rod attached to a piston, said cylinder rod having an opposite end connected to a car retarder mechanism and an opposite piston end, said cylinder being supplied with operating oil by a motor-driven hydraulic pump drawing operating oil from a reservoir and delivering operating oil to the rod end or the piston end of the cylinder via a control valve, said system comprising:
   a directional control valve operable to direct operating oil from a supply line from the pump to a selected end of the cylinder and to direct the return of operation oil via a return line to the reservoir;
   a counterbalance valve between the control valve and each end of the cylinder to hold the position of the cylinder rod at system operating pressure;
   means for preventing operating pressure spikes and excess pressure excursions from propagating to system components that would be damaged;

heat exchange means for controlling the temperature of the operating oil to maintain the oil temperature below a specified maximum operating temperature;

means for filtering the operating oil delivered from the reservoir to the pump and returned to the reservoir from the heat exchange means; and means for operating the retarder from a central freight yard control center or at a location of the retarder.

2. The system as set forth in claim 1 wherein the directional control valve comprises a three position solenoid operated valve providing pressurized hydraulic flow to each end of the cylinder via a selected one of two operating positions, and an open center position providing recirculation of operating oil from the pump to the reservoir.

3. The system as set forth in claim 1 wherein the means for preventing pressure spikes and excursions from propagating comprises, in combination, the counterbalance valves, a check valve in the return line, and a pressure relief valve in the supply line.

4. The system as set forth in claim 3 wherein the directional control valve, the counterbalance valves, the check valve and the pressure relief valve are mounted in a common manifold.

5. A hydraulic control and operating system for a railroad car retarder utilizing a double-acting hydraulic cylinder having a cylinder rod end defined by a cylinder rod attached to a piston, said cylinder rod having an opposite end connected to a car retarder mechanism and an opposite piston end, said cylinder being supplied with operating oil by a motor-driven hydraulic pump drawing operating oil from a reservoir and delivering operating oil to the rod end or the piston end of the cylinder via a control valve, said system comprising:

a directional control valve operable to direct operating oil from a supply line from the pump to a selected end of the cylinder and to direct the return of operation oil via a return line to the reservoir;

a counterbalance valve between the control valve and each end of the cylinder to hold the position of the cylinder rod at system operating pressure;

means for preventing operating pressure spikes and excess pressure excursions from propagating to system components that would be damaged;

heat exchange means for controlling the temperature of the operating oil to maintain the oil temperature below a specified maximum operating temperature, including a heat exchanger in the return line to the reservoir, a high temperature warning sensor in the reservoir operative to generate a high temperature warning signal at a first given oil temperature, and a high temperature shut-down sensor in the reservoir operative to generate a high temperature shut-down signal to shut down the system at a second given oil temperature higher than the first given oil temperature;

means for filtering the operating oil delivered from the reservoir to the pump and returned to the reservoir from the heat exchange means; and means for operating the retarder from a central freight yard control center or at a location of the retarder.

6. The system as set forth in claim 5 wherein the filtering means comprises:

a first oil filter in the supply line between the reservoir and the pump inlet;

a second oil filter in the return line between the heat exchanger and the reservoir;

means for monitoring the oil pressure drop across said filters and generating an excessive pressure drop signal; and, a by-pass valve for each filter to permit a continued flow of oil at a pressure drop higher than the pressure drop causing generations of the excessive pressure drop signal.

7. A hydraulic control and operating system for a railroad car retarder utilizing a double-acting hydraulic cylinder having a cylinder rod end defined by a cylinder rod attached to a piston, said cylinder rod having an opposite end connected to a car retarder mechanism and an opposite piston end, said cylinder being supplied with operating oil by a motor-driven hydraulic pump drawing operating oil from a reservoir and delivering operating oil to the rod end or the piston end of the cylinder via a control valve, said system comprising:

a directional control valve operable to direct operating oil from a supply line from the pump to a selected end of the cylinder and to direct the return of operation oil via a return line to the reservoir;

a counterbalance valve between the control valve and each end of the cylinder to hold the position of the cylinder rod at system operating pressure;

means for preventing operating pressure spikes and excess pressure excursions from propagating to system components that would be damaged;

heat exchange means for controlling the temperature of the operating oil to maintain the oil temperature below a specified maximum operating temperature;

means for filtering the operating oil delivered from the reservoir to the pump and returned to the reservoir from the heat exchange means; and means for operating the retarder from a central freight yard control center or at a location of the retarder, including a programmable microprocessor in the control center operative to transmit retarder control signals to operate the cylinder and to receive and process cylinder position signals and signals from said heat exchange means and said filtering means and a manual control at the retarder operative to lock out control center inputs to the microprocessor and to permit manual operation of the cylinder.

8. The system as set forth in claim 7 wherein the hydraulic cylinder includes a linear position transducer operatively connected to the cylinder rod to generate a cylinder rod position signal based on cylindrical movement corresponding to a control signal from the microprocessor, and wherein the system is operative to shut down if a control signal does not result in a corresponding cylinder rod position signal in a given amount of time.

9. The system as set forth in claim 8 wherein the microprocessor is operative to generate a system shut down alarm to the control center.

10. The system as set forth in claim 7 wherein said operating means further comprises a remote control link to said microprocessor.

11. A hydraulic control and operating system for a railroad car retarder utilizing a double-acting hydraulic cylinder having a cylinder rod end defined by a cylinder rod attached to a piston, said cylinder rod having an opposite end connected to a car retarder mechanism and an opposite piston end, said cylinder being supplied with operating oil by a motor-driven hydraulic pump drawing operating oil from a reservoir and delivering operating oil to the rod end or the piston end of the cylinder via a control valve, said system comprising:

a directional control valve operable to direct operating oil from a supply line from the pump to a selected end of the cylinder and to direct the return of operation oil via a return line to the reservoir;

a counterbalance valve between the control valve and each end of the cylinder to hold the position of the cylinder rod at system operating pressure;

means for preventing operating pressure spikes and excess pressure excursions from propagating to system components that would be damaged;

heat exchange means for controlling the temperature of the operating oil to maintain the oil temperature below a specified maximum operating temperature;

means for filtering the operating oil delivered from the reservoir to the pump and returned to the reservoir from the heat exchange means;

means for monitoring oil level in the reservoir and for generating a low level warning signal and a low level shut down signal; and, means for operating the retarder from a central freight yard control center or at a location of the retarder.

* * * * *